United States Patent [19]

Sawyer et al.

[11] Patent Number: 5,273,734
[45] Date of Patent: Dec. 28, 1993

[54] CONVERSION OF $H_2$ TO SULFUR

[75] Inventors: Donald T. Sawyer; Andrzej Sobkowiak, both of College Station, Tex.

[73] Assignee: The Texas A&M University System, College Station, Tex.

[21] Appl. No.: 464,049

[22] Filed: Jan. 12, 1990

[51] Int. Cl.⁵ .............................. C01B 17/16
[52] U.S. Cl. .................... 423/573.1; 423/220; 423/226; 423/231; 423/578.4; 556/138
[58] Field of Search .............. 423/220, 222, 226, 228, 423/229, 230, 231, 570, 567; 556/2, 5, 138; 546/5

[56] References Cited

U.S. PATENT DOCUMENTS

| | | | |
|---|---|---|---|
| 3,363,989 | 1/1968 | Deal | 23/225 |
| 3,637,345 | 1/1972 | Leder | 423/243 |
| 3,676,356 | 7/1972 | Roberts | 423/220 |
| 4,100,256 | 7/1978 | Bozzelli | 423/243 |
| 4,217,238 | 8/1980 | Sartori | 423/220 |

FOREIGN PATENT DOCUMENTS

| | | |
|---|---|---|
| 7013788 | 2/1974 | Japan . |
| 51-004068 | 1/1976 | Japan . |
| 53-122678 | 3/1977 | Japan . |
| 1005096 | 9/1965 | United Kingdom ........... 423/575 |

OTHER PUBLICATIONS

"Advanced Inorganic Chemistry" by Cotton & Wilkenson John Wiley & Sons, 2nd ed, 1966 pp. 755-756.

Primary Examiner—Gary P. Straub
Assistant Examiner—Timothy C. Vanoy

[57] ABSTRACT

A novel iron chelate treating solution containing a specified ferric chelate, and process for converting $H_2S$, are described.

14 Claims, 1 Drawing Sheet

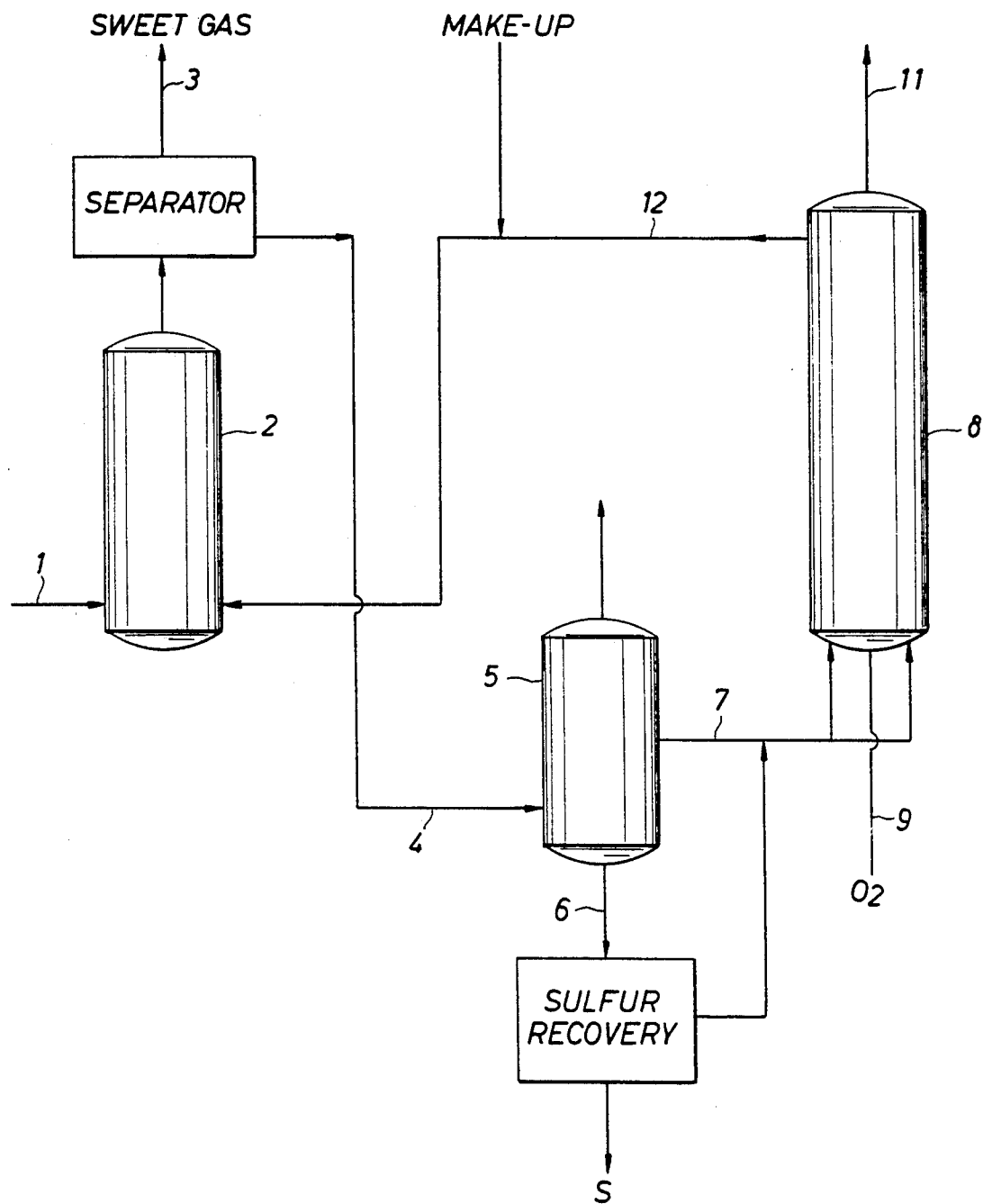

CONVERSION OF H₂ TO SULFUR

ACKNOWLEDGEMENT

The Government has rights in this invention pursuant to Grant No. CHE-8516247 awarded by the National Science Foundation.

FIELD OF THE INVENTION

The invention relates to the conversion of $H_2S$ to form solid sulfur in a solution, preferably an aqueous solution, and to novel reactant solutions. In a preferred form, the invention relates to a process for the removal of $H_2S$ from a gaseous stream by use of a solution comprising a novel ligand system.

DESCRIPTION OF THE PRIOR ART

A number of processes have been developed for the reaction of $H_2S$ or the removal of $H_2S$ from gas streams since the presence of significant quantities of this contaminant in various "sour" industrial gaseous streams poses a persistent problem. For example, U.S. Pat. No. 3,097,925 (Pitts et al) describes a continuous process for the conversion of hydrogen sulfide by use of an oxidation-reduction system characterized by the use of a polyvalent metal ion-chelate complex solution wherein the reduced cation is regenerated to the higher valence state by use of a free oxygen-containing gas. Again, U.S. Pat. No. 3,363,989 (Deal et al) discloses a process for reacting $H_2S$ in an absorbent solution in the presence of a ferrous salt catalyst and a pyridine carboxylic acid chelating agent, the chelating agent being present to maintain the catalyst in a high degree of activity and stability. Although various procedures have been developed to remove and recover contaminant $H_2S$, most such processes are deficient, for a variety of reasons.

In one cyclic method currently attracting attention, the sour gas is contacted with a specified aqueous polyvalent metal chelate or complex reactant system to produce solid sulfur which is recovered either prior to or subsequent to regeneration of the reactant. Preferred reactants are iron (III) complexes in which the iron (III) forms complexes with specified organic acids and derivatives thereof. While this and other removal processes have achieved sufficient efficiency and stability for commercial utilization, a need for alternate significantly stable systems still exists. The invention addresses this need.

SUMMARY OF THE INVENTION

Accordingly, in one embodiment, the invention relates to a process for the conversion of $H_2S$ to sulfur in which the $H_2S$ is contacted under conditions to convert $H_2S$ with a solution containing an effective amount of the ferric complex or chelate of an acid having the formula

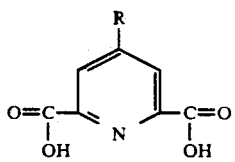

wherein R is selected from H and alkyl containing 1 through 3 carbon atoms, the mol-ratio of the ligand to the iron in the chelate being at least about 2. Preferably, the mol-ratio of the ligand to the iron is from about 2 to about 3. In its preferred form, the invention relates to a process for the removal of $H_2S$ from a sour gaseous stream in which the sour gaseous stream is contacted under conditions to convert $H_2S$ with a solution, preferably aqueous, containing the ferric chelate bis(2,6-dicarboxylato-pyridine)iron(III), the mol-ratio of the ligand of the chelate to the iron being at least about 2, preferably from about 2 to about 3. In its most preferred form, the invention relates to a process of the type described in which the the process is conducted cyclically, the $H_2S$ being converted to S, with concomitant reduction of the ferric iron of the chelate to the ferrous state, the ferrous chelate then being converted by an oxidant or electrochemical regeneration to the ferric state for reuse. The reactions may be shown as follows:

$$4\ Fe^{III}L_2^+ + 2\ H_2S \rightarrow \tfrac{1}{4} S_8 4\ Fe^{II}L_2 + 4\ H^+$$

$$4\ Fe^{II}L_2 + O_2 + 4\ H^+ \rightarrow 4\ Fe^{III}L_2^+ + 2\ H_2O$$

$$2\ Fe^{II}L_2 \rightarrow 2\ Fe^{III}L_2^+ + e^-$$

wherein L represents the ligands specified. In another embodiment, the invention relates to a composition comprising a solution, preferably aqueous, containing the chelate mentioned in an effective amount, the mol-ratio of the ligand of the chelate being at least about 2, preferably from about 2 to about 3.

The source or origin of the $H_2S$ converted is immaterial, so long as other materials present do not interfere with the conversion of the $H_2S$ to any significant extent. In general, if a sour gas stream is treated, the particular type of sour gaseous stream treated is not critical, the only practical limitation being the reactivity of the stream itself with the solution employed, as will be evident to those skilled in the art. Streams particularly suited to removal of $H_2S$ by the practice of the invention are naturally occurring gases, recycled $CO_2$ used in enhanced oil recovery, synthesis gases, process gases, and fuel gases produced by gasification procedures, e.g., gases produced by the gasification of coal, petroleum, shale, tar sands, etc. Particularly preferred are coal gasification streams, natural gas streams, produced and recycled $CO_2$ streams, and refinery feedstocks composed of gaseous hydrocarbon streams, especially those streams of this type having a low ratio of $H_2S$ to $CO_2$, and other gaseous hydrocarbon streams. The term "hydrocarbon stream(s)," as employed herein, is intended to include streams containing significant quantities of hydrocarbon (both paraffinic and aromatic), it being recognized that such streams contain significant "impurities" not technically defined as a hydrocarbon. Again, streams containing principally a single hydrocarbon, e.g., ethane, are eminently suited to the practice of the invention. Streams derived from the gasification and/or partial oxidation of gaseous or liquid hydrocarbon may be treated by the invention. The $H_2S$ content of the type of streams contemplated will vary extensively but, in general, will range from about 0.005 percent to about 10 percent by volume or more. $CO_2$ content will also vary, but may range from about 0.1 percent to about 99.0 percent (or more) by volume. In this context, the invention may be used to remove $H_2S$ from various $CO_2$ streams, e.g., supercritical $CO_2$ streams.

Conditions under which $H_2S$ is converted to sulfur by the Fe(III) present are exemplified herein and are well understood by those skilled in the art. For example, the temperatures employed in the contacting or absorption-contact zone are not generally critical, except that the reaction is preferably carried out below the melting point of sulfur. In many commerical applications, such as removal of H$_2$S from natural gas to meet pipeline specifications, absorption at ambient temperatures is desired, since the cost of refrigeration would exceed the benefits obtained due to increased absorption at the lower temperature. In general, temperatures of from 10° C. to 80° C. are suitable, and temperatures of from 20° C. to 60° C. are preferred. Total contact times will range from about 112 second to about 120 seconds, with contact times of 1 second to 60 seconds being preferred. Pressure conditions in the contacting zone may vary widely, depending on the pressure of the gas to be treated. For example, pressures in the contacting zone may vary from one atmosphere up to one hundred fifty or even two hundred atmospheres. Pressures of from one atmosphere to about one hundred atmospheres are preferred.

If a cyclic procedure is contemplated, temperatures in the regeneration or stripping zone or zones may similarly be varied widely. Preferably, the regeneration zone should be maintained at substantially the same temperature, or somewhat lower, as the contacting zone. In general, temperatures of from about 10° C. to 80° C., preferably 20° C. to 50° C. may be employed.

In a regeneration zone, pressures may also be varied considerably, and will preferably range from about 1 atmosphere to about three or four atmospheres. Residence times for given volumes of admixture and oxygen may be adjusted by those skilled in the art, but will normally range from 1 minute to 60 minutes, preferably from 5 minutes to 20 minutes. The pressure, fluid flow, and temperature relationships involved are well understood by those skilled in the art, and need not be detailed herein.

In a preferred utilization of the invention, the process is conducted continuously. To prevent sulfur build up, sulfur is removed or recovered at a suitable location in the system. Preferably, in a cyclic system, the sulfur is removed from at least the bulk of the admixture after removal of admixture from the contacting zone, but other suitable sites or loci, including slip streams from locations in the process, e.g., from the contactor, may be utilized. The sulfur may also be removed in a separate step after regeneration.

As indicated, the H$_2$S, when contacted, is rapidly converted in the process of the invention by the ferric ion of the chelate to solid elemental sulfur. The amount of ferric ion or chelate supplied or employed in solution is an amount sufficient to convert the H$_2$S present to sulfur or to reduce the H$_2$S concentration or content in a gaseous stream to the desired level, i.e., an effective amount. If total or substantially total conversion or removal is desired, the total amount supplied will generally be on the order of at least about two mols per mol of H$_2$S. Ratios of from about 2 mols to about 15 mols of ferric chelate per mol of H$_2$S May be used, with ratios from about 2 mols per mol to about 5 mols of ferric chelate per mol of H$_2$S being preferred. If a cyclic procedure is employed, it is not necessary that all of the ferrous chelate be oxidized or regenerated before reuse of the solution. Thus, the ratio of ferric chelate to ferrous chelate present in solution may be less than about 6, and may range from about 0.2 to about 6. The solution may be synthesized, as described further herein, or may be produced with the ferric-ferrous ratios specified, in the operations of the process of the invention. The total iron concentration in the solution, as the chelates, based on the total amount of iron supplied originally, will range from about 0.1 percent, preferably about 1 percent to about 7 percent by weight, based on the weight of the solution and iron. The pH in the contacting zone will preferably be maintained in a range of from about 3 to about 10, preferably 6.5 to 8.5, and in the regenerator, from about 7 to 10.

As noted, the regeneration of the reactant is accomplished by the utilization of an oxidant, preferably oxygen supplied as air, or by electrochemical regeneration. Oxidation by air is much preferred, since it will accomplish two functions, the oxidation of ferrous iron of the chelate to the ferric state, and the stripping of any dissolved gas from the admixture. The oxygen (in whatever form supplied) is supplied in a stoichiometric equivalent or excess with respect to the amount of ferrous acid complex present in the mixture. Preferably, the oxygen is supplied in an amount of from about 20 percent to about 300 percent excess. As used herein, the term "oxygen" is not limited to 637 pure" oxygen, but includes air, air-enriched with oxygen, or other oxygen-containing gases. Other suitable oxidants may be employed.

As indicated, the chelates employed are those of the acids having the above-specified formula. Particularly preferred acids are 2,6-dicarboxylato-pyridine (2,6-pyridine dicarboxylic acid) and 4-methyl, 2,6-dicarboxylato-pyridine. The acid may be supplied in any suitable soluble form, such as the free acid, or as the lithium, sodium, potassium, or ammonium salt, or any suitable mixture thereof. The solutions of the chelates are preferably principally water, although other solvents, such as DMF, amines, or other suitable H$_2$S absorbents, may be utilized, either exclusively or in wide proportions with water, e.g., up to 90 percent or more by weight. Other solvents or absorbents which ma be used include those mentioned in U.S. Pat. No. 4,091,073 and U.S. Pat. No. 3,363,989.

The manner of preparing the solutions of the invention is, to some extent, a matter of choice. For example, the solutions employed in the process of the invention may be prepared by simple dissolution of the appropriate acid. They may be prepared by reaction of elemental iron with the appropriate acid, in the proportions described, followed by air oxidation, pH adjustment with ammonium hydroxide, and appropriate water dilution to achieve the desired concentration. Alternately, the acid, ferrous perchlorate, ammonium hydroxide and oxygen (air) may be reacted to prepare the solution, with the appropriate dilution. The novel compositions of the invention may be produced, for example, by separate reduction of one of the above mentioned solutions until the appropriate levels of the ferrous chelate are formed, or the solutions mentioned above may simply be employed in the process of the invention until the appropriate ratios of ferric to ferrous chelate are reached.

DETAILED DESCRIPTION OF THE INVENTION

In order to describe the invention in greater detail, reference is made to the accompanying schematic drawing. The drawing illustrates a continuous cyclic procedure wherein sulfur removal is accomplished in a separate step prior to regeneration. All values are calculated or merely exemplary, and all flows, unless stated otherwise, are continuous.

BRIEF DESCRIPTION OF THE DRAWING

As shown, sour gas, e.g., natural gas containing about 0.5 percent H$_2$S, in line (1) enters contactor or column (2) into which also enters an aqueous mixture comprising an aqueous 0.5M solution of the ferric chelate of 2,6 pyridine dicarboxylic acid, the mol-ratio of the acid to the iron being 2.0 and the mol-ratio of ferric chelate to ferrous chelate being 4. The solution is produced by utilization of the oxidizing effect of air in the regenerator on the solution. That is, the initial solution in the contactor contains a 0.63M aqueous solution of ferric 2,6 pyridine dicarboxylic acid supplied as the ammonium salt. After startup, regeneration, described hereinafter, is controlled so that regeneration of the ferric acid complex is not complete, in the mol-ratios mentioned. Absorber or contactor (2) may be of any suitable type, such as a packed column or tray column, but is preferably an upflow cocurrent column. Depending on the size of the gas stream, the H$_2$S Content, etc., more than one contactor unit may be employed, preferably in series. In any event, in the unit illustrated, the pressure of the feed gas is about 1200 p.s.i.g., and the temperature of the aqueous mixture is about 45° C. A contact time of about 2 to about 10 seconds is employed in order to react all the H$_2$S. The gas and liquid flow to a separator vessel where they are separated, and the purified or "sweet" gas leaves the separator through line (3). In the mixture, the H$_2$S is converted to solid elemental sulfur by the ferric chelate, ferric chelate in the process being converted to ferrous chelate. The aqueous admixture produced, containing elemental sulfur, is removed continuously, and sent through line (4) to a depressurization and degassing unit (5), which also serves as a sulfur concentration or thickening zone. A minor portion, e.g., 5 to 10 percent by volume of the admixture in thickener (5), and containing an increased sulfur concentration, is continuously withdrawn from the lower portion of concentrator (5) and sent via line (6) to sulfur recovery.

Sulfur recovery may be accomplished in any suitable fashion, such as by filtration. Preferably, however, sulfur is recovered by that method described in U.S. Pat. No. 4,705,676, incorporated herein by reference. Solution recovered during sulfur recovery may be returned to any suitable point in the process, if proper adjustment is made, but is preferably sent, as shown, to the regeneration zone. The major portion of the aqueous admixture in vessel (5), having a reduced sulfur content, is removed via line (7) for regeneration of ferric chelate. In regeneration zone or column (8), the admixture is contacted with excess air from line (9) to convert ferrous chelate to ferric chelate.

Regeneration zone (8) comprises a sparged tower regenerator with cocurrent upflow of oxygen (as air), via line (9), and aqueous admixture. Air velocity in the regenerator is in the range of 0.1 to 0.3 feet per second. The temperature in the column is about 45° C., and overall pressure is about 2 atmospheres. Spent air is removed via line (11), and regenerated admixture, having a mol-ratio of ferric chelate to ferrous chelate of about 4 is returned via line (12) to column 2.

While the invention has been illustrated with particular apparatus, those skilled in the art will appreciate that, except where specified, other equivalent or analogous units may be employed. The term "zones", as employed in the specification and claims, includes, where suitable, the use of segmented equipment operated in series, or the division of one unit into multiple units because of size constraints, etc. For example, a contacting zone may comprise two separate counter-current columns in which the solution from the lower portion of the first column would be introduced into the upper portion of the second column, the partially purified gaseous material produced from the upper portion of the first column being fed into the lower portion of the second column. Parallel operation of units is, of course, well within the scope of the invention. Admixture or solution withdrawal or introduction may be made at any suitable site(s) or loci in the particular zone. The return of solution to one or more multiple contacting units in the contacting zone from a regenerator, or the use of a common regenerator, is within the scope of the invention.

Again, as will be understood by those skilled in the art, the solutions or mixtures employed may contain other materials or additives for given purposes. For example, U.S. Pat. No. 3,933,993 discloses the use of buffering agents, such as phosphate and carbonate buffers. Similarly, other additives, such as antifoaming and/or wetting agents, may be employed.

What is claimed is:

1. A process for the removal of H$_2$S from a sour gaseous stream comprising
    a) contacting the sour gaseous stream with a reactant solution in a contacting zone, the reactant solution containing an effective amount of the ferric chelate of an acid having the formula

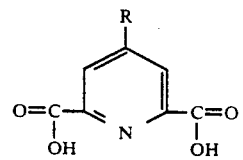

wherein R is selected from H and alkyl containing 1 through 3 carbon atoms, the mol-ratio of the ligand to the iron in the chelate being at least about 2, under conditions to convert H$_2$S to sulfur, producing a gaseous stream having reduced H$_2$S content, and an admixture containing solid sulfur and ferrous chelate in solution,
    b) regenerating admixture by contacting said admixture with an oxidant under conditions to convert ferrous chelate of said acid to ferric chelate, and producing regenerated reactant solution; and
    c) passing the regenerated reactant solution to the contacting zone for use as reactant solution therein.

2. The process of claim 1 wherein the reactant solution is an aqueous reactant solution and sulfur is removed at a locus in the process.

3. The process of claim 2 wherein the ferric chelate is bis (2,6-dicarboxylato-pyridine)iron(III).

4. The process of claim 3 wherein the mol-ratio of the ligand to the iron in the chelate is from about 2 to about 3.

5. The process of claim 4 wherein the contacting is carried out at a temperature below the melting point of sulfur.

6. A process for the removal of H$_2$S from a sour gaseous stream comprising a) contacting the sour gaseous stream with aqueous reactant solution in a contacting zone at a temperature below the melting point of sulfur, the reactant solution containing an effective amount of the ferric chelate of an acid having the formula

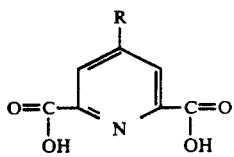

wherein R is selected from H and alkyl containing 1 through 3 carbon atoms, the mol-ratio of the ligand to the iron in the chelate being at least about 2, under conditions to convert $H_2S$ to sulfur, producing a gaseous stream having reduced $H_2S$ content, and an aqueous admixture containing solid sulfur and additional ferrous chelate in solution, the mol-ratio of the ferric to ferrous chelate in the reactant solution being from about 0.2 to about 6;

b) removing aqueous admixture from the contacting zone and removing sulfur from at least a portion of said admixture;

c) regenerating aqueous admixture by contacting said aqueous admixture with oxygen in a regeneration zone under conditions to convert ferrous chelate of said acid to ferric chelate of said acid, and producing regenerated aqueous reactant solution having a ratio of ferric chelate to ferrous chelate of from about 0.5 to about 6;

d) passing regenerated aqueous reactant solution to the contacting zone for use as aqueous reactant solution therein.

7. The process of claim 6 wherein the stream from which the $H_2S$ is removed is selected from naturally occurring gases, synthesis gases, process gases, and fuel gases.

8. The process of claim 7 wherein the ferric chelate is bis (2,6-dicarboxylato-pyridine)iron(III).

9. The process of claim 8 wherein the mol-ratio of the ligand to the iron in the chelate is from about 2 to about 3.

10. The process of claim 6 wherein the sour gaseous stream is natural gas, a stream derived from the gasification of coal or a liquid hydrocarbon, or a stream comprising $CO_2$.

11. A process for the removal of $H_2S$ from a sour gaseous stream comprising
a) contacting the sour gaseous stream with aqueous reactant solution in a contacting zone, the reactant solution containing an effective amount of the ferric chelate of an acid having the formula

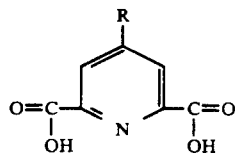

wherein R is selected from H and alkyl containing 1 through 3 carbon atoms, the mol-ratio of the ligand to the iron in the chelate being at least about 2, under conditions to convert $H_2S$ to sulfur, producing a gaseous stream having reduced $H_2S$ content, and an aqueous admixture containing solid sulfur and ferrous chelate in solution, b) electrochemically regenerating aqueous admixture to convert ferrous chelate of said acid to ferric chelate of said acid, and producing regenerated aqueous reactant solution; and c) passing the regenerated aqueous reactant solution to the contacting zone for use as aqueous reactant solution therein.

12. The process of claim 11 wherein the ferric chelate is bis (2,6-dicarboxylato-pyridine)iron(III).

13. The process of claim 12 wherein the mol-ratio of the ligand to the iron in the chelate is from about 2 to about 3.

14. The process of claim 13 wherein the contacting is carried out at a temperature below the melting point of sulfur.

* * * * *